United States Patent [19]

Key et al.

[11] 4,310,425

[45] Jan. 12, 1982

[54] INHIBITED OIL FIELD DRILLING FLUID

[75] Inventors: Morris D. Key, Dallas; William H. Crawford, Jr., Fort Worth, both of Tex.

[73] Assignee: Halabs, Incorporated, Fort Worth, Tex.

[21] Appl. No.: 140,994

[22] Filed: Apr. 17, 1980

[51] Int. Cl.³ .............................................. C09K 7/02
[52] U.S. Cl. .............................. 252/8.5 A; 252/187 R
[58] Field of Search ............ 252/8.5 R, 8.5 A, 8.5 C, 252/187 R

[56] References Cited

U.S. PATENT DOCUMENTS

| | | | |
|---|---|---|---|
| 2,071,091 | 2/1937 | Taylor | 252/187 R X |
| 2,417,307 | 3/1947 | Larsen | 252/8.5 C |
| 3,065,040 | 11/1962 | Waibel | 252/187 R |
| 3,086,937 | 4/1963 | Fischer | 252/8.5 C |
| 3,120,424 | 2/1964 | Ruedi | 252/187 R X |
| 3,223,621 | 11/1965 | Marlow et al. | 252/8.5 C |
| 3,306,858 | 2/1967 | Oberle | 252/187 R X |
| 3,836,475 | 9/1974 | Kirner | 252/187 R |
| 4,084,747 | 4/1978 | Alliger | 252/187 R X |
| 4,104,190 | 8/1978 | Hartshorn | 252/187 R |

*Primary Examiner*—Herbert B. Guynn
*Attorney, Agent, or Firm*—Arthur F. Zobal

[57] ABSTRACT

A drilling fluid containing water, a density-increasing agent, and a carbohydrate additive that is subject to deleterious attack in the drilling fluid to which is added a system that will produce in situ in the drilling fluid chlorine dioxide ($ClO_2$) for alleviating deleterious attack on the carbohydrate additive. The system producing the chlorine dioxide must produce an initial concentration which will reduce the viable organism count and maintain a residual concentration over a protracted interval of time so as to maintain the low bacterial level, maintain the pH of the drilling fluid in the range of 6.0–8.0, and otherwise not interfere with the rheological and beneficial effects of the drilling fluid.

9 Claims, No Drawings

INHIBITED OIL FIELD DRILLING FLUID

BACKGROUND OF THE INVENTION

1. Field of the Invention

This invention pertains to drilling fluids for use with drill strings and drill bits for drilling bore holes penetrating into subterranean formations of the earth. More particularly, this invention relates to such drilling fluids in which carbohydrate additives are preserved from deleterious attack so as to maintain the desired rheological, lubricating and other properties of drilling fluid.

2. Description of the Prior Art

The prior art has seen the use of wide variety of different materials to prevent the destruction of integrity of drilling fluids and maintain their rheological properties so they continue to lubricate the bit, gel with stoppage so as to prevent the falling back of cuttings, reduce the filtrate loss into permeable formations with the result of water damage and the like. This is particularly the case with drilling fluids that have employed carbohydrate additives such as polysaccharides, carboxymethylcellulose and similar compounds or materials. For example, formaldehyde and paraformaldehyde have been employed as microbiocides in drilling fluids.

Chloride dioxide has been demonstrated to be an effective microbiocide; for example in the paper industry and in textile bleaching. It is known to be a powerful and effective oxidizing agent. Illustrative of the types of prior art availabe are the following: In a summary entitled "THE CHEMISTRY OF CHLORINE DIOXIDE", Messrs. Gilbert Gordon, Robert G. Kieffer and David H. Rosenblatt "Progress In Inorganic Chemistry", Volume XV, S. L. Lippard, Editor John Wiley & Sons, New York, N.Y., 1972; pages 201–286, have shown a collection of 230 references related to chlorine dioxide. There are several United States Patents such as U.S. Pat. Nos. 3,123,521 and 4,104,190, relating to chlorine dioxide. U.S. Pat. No. 3,123,521 describes a stabilized chlorine dioxide used as a commerical germicide using sodium carbonate peroxide. U.S. Pat. No. 4,104,190 describes difficulties with the prior art requiring a highly acid environment for generation of chlorine dioxide from chlorine dioxide precursors; for example in pH's of 2–3 or lower; and then describes a method of employing a chlorine emitter to effect production of chlorine dioxide at pH's in the range of 4–9. There is a wide variety of U.S. Patents relating the chlorine dioxide in a variety of uses.

In so far as we are aware, however, the prior art has not shown the inclusion in drilling fluid of a system, or a combination of components, that will effect the rapid release of $ClO_2$ by a nonchlorine type initiator at pH>8 which will maintain a bacteriostatic level of $ClO_2$ over a protracted time interval due to the containment of the stoichiometric buffer in the system for the prevention of the deleterious attacks on carbohydrate constituents of drilling fluids.

SUMMARY OF THE INVENTION

Accordingly it is an object of this invention to provide an oil well drilling fluid or the like in which drilling fluid is circulated for a variety of reasons, having a system, or combination of components, that will effect production of chlorine dioxide with its desirable properties useful in prolonging the life of components of the drilling fluid, without intolerably decreasing the pH of the drilling fluid or otherwise undesirably affecting the properties of the drilling fluid.

It is a specific object of this invention to provide in a drilling fluid being circulated through a drill string and a bit penetrating into earth subterranean formations for a variety of reasons; such as, lubricating the bit, bringing the cuttings to the surface and the like, and containing water, a density increasing agent, and a carbohydrate additive for controlling desirable rheological properties; a system that will emit chlorine dioxide rapidly at first and then at a reduced rate over a protracted time interval and employ the chlorine dioxide alone or in conjunction with prior art constituents as a synergistic additive to prolong the life of the carbohydrate additive in the drilling fluid without adversely affecting the properties of the drilling fluid.

These and other objects will become apparent from the invention described hereinafter.

In accordance with this invention there is provided an improved drilling fluid wherein the drilling fluid is circulated through the drill string and bit drilling into subterranean formation and back to the surface for bringing cuttings to the surface, lubricating the bit, and the like; the drilling fluid containing water, a density-increasing agent, and a carbohydrate additive for controlling the rheological properties of the drilling fluid, the carbohydrate additive being subject to deleterious attack in the drilling fluid through the presence of undesirable elements such as microorganisms and free radicals; the improvement comprises adding to the drilling fluid a chlorine dioxide-producing system that will produce the chlorine dioxide rapidly at first, and then at a reduced rate over a protracted time interval without adversely affecting the properties of the drilling fluid. In the preferred embodiment, the chlorine-producing system consists essentially of a chlorine dioxide precursor $MClO_2$ where M is an alkali metal cation or an alkaline earth metal cation; a stoichiometric buffer system for controlling the pH in the range of 6–8; and an initiator for producing the chlorine dioxide rapidly. The stoichiometric buffer system supplies hydrogen ion which then allows the precursor to continue to produce $ClO_2$ slowly and over a protracted interval; the chlorine dioxide serving to prolong the life of the cellulosic additive by reducing the microorganism and free radical attack.

DESCRIPTION OF THE PREFERRED EMBODIMENTS

The types of drilling fluids in which this invention is employed have been known for a long time. Specifically, as is known, the drilling fluid is circulated through a drill string and a bit drilling into subterranean formations and back to the surface. The drilling fluid serves a variety of purposes including lubricating the bit, bringing cuttings to the surface, building a filter cake on the walls of the bore hole where it is not cased to minimize invasion of fluid into the formation. As indicated hereinbefore, the drilling fluid serves as a hydraulic force against the face of the formation to prevent blowout of high pressure formations and the like. For this reason, it needs a density increasing agent to increase the weight of the column of drilling fluid and minimize the danger of blowout. Moreover, the drilling fluid needs to possess rheological properties such that when shear stops, as through the stopping of circulation for some reason, the cuttings do not fall back into the well bore and stick the bit and make necessary costly washover jobs. These well known properties of the drilling fluid must not be altered. Yet, the carbohydrate additives that have been frequently employed for controlling rheological properties have been subject to deleterious attack through action of microorganisms, free radicals, oxidation, and the like. As indicated, the drilling fluids heretofore have included the water, the density increasing agent, and the carbohydrate additive.

The water that is employed is any of the conventionally available waters and may range from relatively pure lake water, through river water, well water that is obtained from subterranean formations and may include stagnant water and water of relatively high salinity and the like.

The density increasing component may comprise a single component or a multiplicity of components. Typical of such components are barium sulfate or other additives that are readily commercially available from the drilling mud service companies. Frequently, the density increasing agents are barium compounds because of the relatively high density of these materials. In some drilling fluids, however, the density increasing agents may be simply soluble material like sodium chloride that converts the water to a brine system for shallow drilling. All of the known density increasing agents that are employed in the prior art are compatible with this invention.

The carbohydrate additive that is employed in the drilling fluid may comprise starch, polysaccharides, carboxymethylcellulose, carboxyethylcellulose, carboxymethylhydroxyethylcellulose or simmilar such derivatives from cellulose containing compounds for controlling rheological properties of drilling fluid, such as the time thickening, shear thinning properties, the tendency to build a good filter cake yet have a low failure loss in the formation that may be permeable.

In the prior art, anti-microbial agents such as formaldehyde and paraformaldehyde have frequently been employed to prolong the life of a cellulosic additive. Such anti-microbial agents have proven objectionable in the light of the recent rulings from the ENVIRONMENTAL PROTECTION AGENCY, since these materials are not readily bio-degradable.

Accordingly, this invention enables reducing or even eliminating such non bio-degradable components of drilling fluids by supplementing or replacing the prior art type agents with a system that will yield chlorine dioxide, yet that is not objectionable from the point of view of the protection of the environment.

The preferred improvement of this invention comprises adding to the drilling fluid a chlorine dioxide producing system that does not adversely affect the properties of the drilling fluid. The chlorine dioxide producing system consists essentially of:

a. a chlorine dioxide precursor as set forth herein:

b. a stoichiometric control agent for controlling the pH between 6–8; and c. an initiator for rapidly producing the initial chlorine dioxide concentration required to reduce the organism count to an acceptable level.

The chlorine dioxide precursors are: (1) the alkali metal chlorites or the alkaline earth metal chlorites; and (2) chlorate-chloride ion mixtures, such as sodium chlorate and sodium chloride. Of these, sodium chlorite, $NaClO_2$, is economically advantageous over the other chlorites.

The pH control agent is preferably a buffer comprised of a Bronsted base with a pK value in the range of 6–8. Specifically, the pH control agent is preferably selected from the buffers QX, where Q is an alkali metal cation, and X is an acid phosphate anion, a borate anion, a tetraborate anion, or some organic acid such as citrate, or lactate anions. Preferably, the more economical inorganic buffers are employed. This means that the alkali metal cation will ordinarily be sodium or potassium. The preferred anions will be the acid phosphates such as dihydrogen phosphate. Specifically set forth, the preferred buffers are sodium dihydrogen phosphate $NaH_2PO_4$; sodium borate $Na_3BO_3$; sodium tetraborate $Na_2B_4O_7$ (also known as Borax). Other acid buffers that can be employed to produce minimally satisfactory buffering are the alkali metal citrates, lactates and the like.

The initiators that are employed herein may also be referred to as microzone pH activating agents or accelerants. The preferred initiators are selected from the group consisting of those acid salts which when introduced to a water solution produce a microzone of low pH within a bulk matrix of substantially higher pH. Illustrative of these acid salts are the $XHnA$'s; where X is alkali metal, ammonium, or alkaline earth metal cation, H is hydrogen, n is 1 or 2, and A is an anion, such as sulfate or phospate. Specific satisfactory acid salts include $NaHSO_4$, $NaH_2PO_4$ and the like. Upon long standing or agitation, the microzone of low pH dissipates. However, if such an initiator is added to the chlorine dioxide precursor and stoichiometric buffer system herein described, rapid evolution of $ClO_2$ occurs without a reduction in the pH of the bulk matrix.

The respective concentrations of the precursor, initiator and buffer are difficult to set forth specifically because of the wide variety of systems in which they may be employed in drilling fluids. It is noteworthy that the chloride dioxide is efficacious in concentrations as small as 0.1 part per million (ppm). Accordingly, amounts of the respective precursor, initiator and buffer are effective in concentration as low as 1 part per million, to produce continuously and slowly and over the requisite extended time interval, the chlorine dioxide for the desired beneficial results. Preferably, however, the precursor is employed in a concentration of at least ten parts per million and may be employed in a concentration of about 1000 parts per million or more without adverse affect. It may be economically disadvantageous to employ higher concentrations.

The buffer that is employed as the pH control agent is employed in a concentration that is stoichiometric with the amount of precursor that is employed. Expressed otherwise, the buffer in a mol equivalent concentration to the concentration of precursor employed. The small amounts of the buffers that have been employed in the prior art systems, were employed for reasons different from those set forth herein and, in any event, were employed in concentrations so small as to make them non-efficacious for the purposes set forth herein.

For example, the buffer that is employed stoichiometrically may be a proportion of about 1.6 times by weight the amount of the precursor that is employed. Expressed otherwise, when 10 to 100 parts per million of precursor is employed, the buffer is present in a concentration in the range of 16–160 parts per million. The buffer may be employed in a smaller amount when the precursor is employed in a smaller amount. Similarly as with the precursor, it may not be economically advantageous to employ concentrations much above 2000 parts per million of the buffer in the drilling fluid.

The initiator is employed in an amount relative to the precursor so as to produce $ClO_2$ rapidly in an amount proportionate to the organism killing capacity required. For example, the initiator may be employed in concentrations as low as one part per million and it may be economically disadvantageous if employed above about 1000 parts per million. Thus from the foregoing, it can be seen that as little as 0.001 percent by weight of the components of the chlorine dioxide producing system can be efficacious, although as much as 0.1 percent by weight will give 1000 parts per million so as to be better in terms of prolonging the life of the carbohydrate additives and the properties of the drilling fluid.

Implicit in the foregoing discussion is that this invention takes advantage of one or both of two phenomena to effect liberation of chlorine dioxide. There are two theories to explain why this invention is effective, but this invention works whether or not the theories are accurate. Firstly, the acid salt initiator is added to liberate hydrogen ions to form micro zones of low pH for instantaneously releasing the chlorine dioxide. The chloride dioxide is effective for its described purpose. The acid salt can be added in a plurality of ways. For example, the solid, powdered acid salt can be added to give a large yield of chlorine dioxide of short duration for shocking the system. This will work when used in conjunction with the controlling of the pH in the range of 6-8 with the hypochlorite and reducing agent to provide the chlorine dioxide over a prolonged time. On the other hand, if desired, the acid salts can comprise acid salt, per se, and acid salt encapsulated in time release capsules. The time release capsules have coatings that will be dissolved away over different lengths of time to give a time release of the acid salt initiators. Typical of the coatings are protein matrices; coatings of a neutral salt, such as calcium carbonate; coatings of the hydrolyzable cellulose or hydrolyzable polysacchrides to release the acid salt initiators over different periods of time to effect a continuing release and reaction to produce the chlorine dioxide.

The second theory is that hypochlorite oxidizes chlorite ion to $ClO_2$ and is concomitantly reduced in a controlled pH of near neutral to provide a solution of chlorine dioxide gas dissolved in the neutral liquid matrix, the chlorine dioxide being stable for a useful period of time, up to several hours. If the $ClO_2$ does not oxidize someother species, for example, free radicals or bacteria, it slowly undergoes auto-oxidation-reduction, being converted to chlorite, chloride, chlorate, prechlorate, and the like.

The following examples set forth illustrative concentrations that can be employed with a wide variety of different types of drilling fluids.

EXAMPLE I

This example illustrates a simple system in which starch is included with brine for drilling shallow wells or the like. In this system, 3.5 percent by weight sodium chloride, brine includes 1.5 percent by weight starch. A concentration of 0.01 percent by weight, or 100 ppm, sodium chlorite is added. This is equivalent to 100 parts per million sodium chlorite in the drilling fluid. Buffer in the amount of 0.016 percent by weight or 160 parts per million is included. An initiator of sodium hydrogen sulfate is included in a concentration of 0.01 percent by weight, or 100 parts per million.

The drilling fluid is conditioned initially by the rapidly released $ClO_2$ and maintains its desirable properties over a protracted interval that is much greater than the drilling fluid when employed without the chlorine dioxide producing system. The desirable properties are maintained due to the protection of the cellulosic components by the chlorine dioxide released over a protracted time period by the stoichiometric buffer system. Such protection is afforded by inhibition of bacterial growth and scavenging free radicals. Both the bacteria and free radicals are deleterious to the cellulosic components.

EXAMPLE II

In the drilling fluid in Example I, the sodium chlorite is reduced to only 10 parts per million. The buffer is reduced to 16 parts per million and the sodium hydrogen sulfate is reduced to 10 parts per million and paraformaldehyde is included in the drilling fluid. The synergistic effect is that the combination of only 10 parts per million of paraformaldehyde and 10 parts per million of the system for producing chlorine dioxide is as efficacious as the 100 parts per million of the formaldehyde alone.

More complicated drilling fluid systems will be tested under field conditions in verifying this invention.

From the foregoing, it can be seen that this invention achieves the object delineated hereinbefore and provides an improved drilling fluid.

Having thus described the invention, it will be understood that such description has been given by way of illustration and example and not by way of limitation, reference for the latter purpose being had to the appended claims.

What is claimed is:

1. In a drilling fluid for use in drilling a well wherein said fluid circulated through a drill string and bit penetrating subterranean formations and back to the surface for lubricating the bit, bringing rock cuttings and the like to the surface, said drilling fluid including water and a density increasing agent; the improvement comprising:

a. a carbohydrate additive selected from the class consisting of starch, carboxymethylcellulose, carboxyethylcellulose and carboxymethylhydroxyethylcellulose for controlling rheological properties, the carbohydrate additive being subject to the deleterious attack in the drilling fluid through the presence of undesirable elements including microorganisms and free radicals, and b. a chlorine dioxide-producing system consisting essentially of a chlorine dioxide precursor $MClO_2$, where M comprises at least one of alkali metal cation and alkaline earth metal cation, and an acid salt, non-chlorine type initiator $XH_nA$, where X is alkali metal, ammonium, or alkaline earth metal cation, H is hydrogen, n is one or two, A is an acid anion selected from the class consisting of sulfate and phosphate for producing a micro zone of low pH within the drilling fluid for rapidly producing the chlorine dioxide to condition the drilling fluid and curtail the deleterious attack on the cellulosic additive.

2. The drilling fluid of claim 1 wherein at least a portion of said acid salt initiator is coated with time release agents to provide exposure of said initiator to said drilling fluid over a protracted interval of time.

3. The drilling fluid of claim 1 wherein said initiator is sodium hydrogen sulfate.

4. The drilling fluid of claim 1 wherein there is also included a stoichiometric buffering agent comprising a Bronsted base with pK value in the range of 6-8 for controlling the pH of the drilling fluid in the range of 6-8 in order to produce chlorine dioxide slowly and over a protracted interval of time, said chlorine dioxide serving to prolong the life of said carbohydrate additive by reducing the microorganism and free radical attack.

5. The drilling fluid of claim 4 wherein said stoichiometric buffering control agent is a Bronsted base QX, where Q is an alkali metal cation, and X is selected from the group consisting of acid phosphate anion, borate anion, tetraborate anion, citrate anion, and lactate anion.

6. The drilling fluid of claim 4 wherein said stoichiometric buffering control agent is selected from the class consisting of alkali metal dihydrogen phosphate, alkali metal borate, alkali metal tetraborate, alkali metal citrate, and alkali metal lactate.

7. The drilling fluid of claim 4 wherein said drilling fluid contains said chlorine dioxide precursor, initiator and pH control agent in a concentration of at least one part per million of each.

8. The drilling fluid of claim 7 wherein said drilling fluid contains at least 10 parts per million of said chlorine dioxide precursor, 16 parts per million of said pH control agent and 10 parts per million of said initiator; said pH control agent being present in stoichiometric concentration equivalent to said precursor.

9. The drilling fluid of claim 4 wherein at least a portion of said initiator is coated with a time release agent for effecting release of said initiator into said oil well drilling fluid over a protracted interval for producing microzones of low pH and hence chlorine dioxide over a protracted interval.

* * * * *